(12) United States Patent
Hamery et al.

(10) Patent No.: US 7,642,002 B2
(45) Date of Patent: Jan. 5, 2010

(54) DEVICE FOR COOLING BATTERIES OF AN ELECTRONICALLY AND/OR HYBRID POWERED VEHICLE

(75) Inventors: Bruno Hamery, Paris (FR); Christophe Aloup, Paris (FR); Gunter Krempel, Bad Rodach (DE); Roland Haussmann, Wiesloch (DE)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 862 days.

(21) Appl. No.: 11/239,807

(22) Filed: Sep. 30, 2005

(65) Prior Publication Data

US 2006/0073378 A1    Apr. 6, 2006

(30) Foreign Application Priority Data

Oct. 1, 2004   (FR) .................................... 04 10426

(51) Int. Cl.
*H01M 10/50* (2006.01)
*B60R 16/04* (2006.01)

(52) U.S. Cl. .................. 429/120; 180/68.1; 180/68.5; 903/907

(58) Field of Classification Search ................. 429/120; 180/68.1, 68.2, 68.5; 903/907
See application file for complete search history.

(56) References Cited

U.S. PATENT DOCUMENTS 5,320,190 A    6/1994  Naumann et al.
5,490,572 A    2/1996  Tariji et al.
5,585,204 A  * 12/1996  Oshida et al. ................. 429/62
5,937,664 A    8/1999  Matsuno et al.

FOREIGN PATENT DOCUMENTS

| EP | 1376733 A2 | 1/2004 |
|---|---|---|
| FR | 2829619 A1 | 3/2003 |
| JP | 08 040088 A | 2/1996 |
| JP | 2001102099 A * | 4/2001 |
| WO | 9943509 A1 | 9/1999 |

OTHER PUBLICATIONS

English language abstract for FR2829619 extracted from espacenet.com database, dated Jun. 16, 2009, 1 page.
INPI Institut National De La Propriete Industrielle search report for FA65681/FR0410426, dated May 18, 2005, 1 page.

* cited by examiner

*Primary Examiner*—Gregg Cantelmo
(74) *Attorney, Agent, or Firm*—Howard & Howard Attorneys PLLC (57) ABSTRACT

A device for cooling batteries, particularly of an electric and/or hybrid vehicle comprises a pair of compartments (1, 12) in communication with one another, including a first compartment (1) housing the batteries distributed among adjacent columns and a second compartment (12) housing at least a blower (14). One of these compartments (1, 12) has an air intake aperture (5) while the other compartment (1, 2) has a discharge aperture (5) for discharging the admitted air to the outside. The first compartment (1) is equipped with means for modifying the dynamics of the air passing through it, starting from an axial circulation of air along the columns of batteries.

36 Claims, 5 Drawing Sheets fig.1 fig.2 fig.3 fig.4 fig.5 fig.6 fig.7 fig.10 fig.14 fig.15 fig.17 fig.18 fig.19 fig.16

DEVICE FOR COOLING BATTERIES OF AN ELECTRONICALLY AND/OR HYBRID POWERED VEHICLE

TECHNICAL FIELD OF THE INVENTION

The invention is of the field of devices for cooling batteries, more particularly the batteries of an electrically and/or hybrid powered vehicle. The subject of the invention is such a cooling device which works by circulating air around a plurality of juxtaposed battery cells.

PRIOR ART

It will be recalled that hybrid powered vehicles comprise two power sources, one of the combustion type and the other of the electrical type, these being used alternately or in combination. Electrically powered vehicles, for their part, have only an electrical type of power source. The electrical energy in electrically or hybrid powered vehicles is supplied by a module of batteries, particularly of the NiMH or lithium-ion type, which comprises a plurality of battery cells, of the order of 50 to 400 cells, which are distributed in series or in series-parallel. In the case of a distribution in series, the battery cells are arranged in adjacent columns, each column comprising several battery cells butted axially together.

One problem presented lies in the operation of the batteries over a given temperature range. It has been found that there is a need to cool the batteries. It has been proposed for the batteries to be placed inside a casing within which a stream of air is made to flow by means of a blower or the like, so as to circulate this air between the battery cells. Reference may, for example, be made to documents FR2829619 (PEUGEOT CITROEN AUTOMOBILES S.A.), U.S. Pat. No. 5,320,190 (AUDI NSU AUTO UNION AG), WO99/43509 (EXIDE CORP) and EP1376733 (TOYOTA MOTOR CO LTD).

More specifically, one difficulty that needs to be overcome lies in effective, regulated and uniform cooling of all the batteries, regardless of their location within the module. A particular goal is to increase the battery life by minimizing the radial and axial temperature gradients across the batteries so that the skin of the batteries does not exceed a temperature of the order of 30° C. As there is already a radial gradient of 10 to 20° C. when the batteries are under maximum load, this means that the skin temperature of the batteries needs to be as uniform as possible, and more specifically that the temperature difference between two points on the skin of the batteries must not exceed 5° C. Furthermore, this constraint also proves to be necessary so that all the battery cells behave the same way during charging and during discharging. This ultimately means that, in order to obtain such battery skin temperature uniformity, a maximum temperature difference between the temperature of the air entering the batteries module and the temperature of the air leaving this module needs to be of the order of 5° C.

It would seem sensible to optimize the use of the air stream for effective cooling of the batteries with the lowest possible energy consumption.

Furthermore, the air circulating around the batteries is liable to become contaminated by the latter and has therefore to be rejected to the outside in order to avoid intoxicating the occupants of the vehicle. This also means that ways of sealing the device need to be provided. In addition, the opening of this device to the outside is likely to cause an acoustic nuisance and an arrangement of the device that limits such nuisances must be taken into consideration.

The way in which the device is organized must offer solutions to the various problems listed without in any way resulting in a size that precludes it being installed on the vehicle in the smallest possible space.

SUBJECT OF THE INVENTION

The object of the present invention is to propose a device for cooling batteries of a hybrid vehicle in particular, which obviates the aforementioned problems and difficulties.

The device of the present invention is intended for cooling batteries of an electrically or hybrid powered vehicle. These batteries are arranged inside a battery compartment, being distributed among a plurality of adjacent columns. Said device employs means for circulating air around the batteries.

According to the present invention, such a device is mainly recognizable in that it comprises a pair of compartments in communication with one another. A first compartment houses the batteries and a second compartment houses at least a blower. Either one of these compartments has an air intake aperture, while the other compartment has a discharge aperture for discharging the admitted air to the outside.

It is evident from these arrangements that the batteries are effectively cooled using the air collected using the blower, to be rejected to the outside of the cabin, without these arrangements causing prohibitive acoustic or physical nuisance to the occupants of the vehicle. However, it is evident that such arrangements need to be supplemented in order to successfully optimize the uniform cooling of the batteries.

The first compartment is advantageously equipped with means for modifying the dynamics of the air passing through it, starting from an axial circulation of air along the columns of batteries. These arrangements are such that the cooling performance of the device along the length of the path of the air passing through the first compartment is constant, and that the skin temperature of the batteries is uniform, whatever their individual location within the compartment. It is also evident from these arrangements that the air stream needed for cooling the batteries can be reduced, the advantage of this being a reduction in the energy consumption of the device and a reduction in acoustic nuisance. These arrangements also result in the use of the axial dimension of the device in which to house the means for modifying the dynamics of the air without increasing their size.

According to a preferred embodiment variant, the first compartment has air intake means located on the side of the columns, more particularly transversely with respect to the axis along which these columns lie, and means for routing the admitted air toward an upstream ventilation space located in a plane more or less orthogonal to the columns of batteries, so as to cause air to circulate along the latter axially toward a downstream ventilation space more or less orthogonal to the columns of batteries. These arrangements are aimed in particular at making the air circulation uniform from the upstream to the downstream end of the batteries.

The first compartment comprises in particular respective air intake and discharge apertures which are formed on the sides of the columns of batteries. These intake and discharge apertures open respectively onto elbowed lateral air inlet and outlet ducts. These ducts are in communication with the upstream and downstream ventilation spaces so that the air is admitted more or less orthogonally to the columns to be routed toward the upstream ventilation space through an upstream elbowed duct, then circulated axially along the columns of batteries toward the downstream ventilation space, then discharged laterally through a downstream elbowed duct.

As a preference, an airflow restriction nozzle is located upstream of the upstream ventilation space, particularly near the elbow in the upstream lateral duct. These arrangements are such that the pressure drop in the upstream ventilation space is compensated for by an increase in the air speed toward the downstream compartment.

The volume of the upstream ventilation space is preferably greater than the volume of the downstream ventilation space. These arrangements are such that the air is thereby encouraged to circulate because of a pressure differential generated between the upstream space and the downstream space.

The first compartment preferably comprises means to encourage the air passing through it to become turbulent and/or to accelerate.

More particularly, the columns of batteries are housed inside respective sleeves which are of variable thickness, reducing from their downstream end toward their upstream end. These arrangements are such that the heating-up of the air upon contact with the batteries is compensated for by an increase in the air speed toward the downstream end of the sleeves, so as to make the efficiency with which the batteries are cooled by the air more uniform.

The sleeves are, in particular, spaced apart by cross-members forming corridors for the axial circulation of air between and along the columns of batteries, and are preferably equipped with radial spacer pieces holding the columns of batteries in place and forming axial air circulation chambers around these columns.

The columns of batteries are preferably wrapped in a sheath which advantageously has ribs for contact with the sleeves so as to encourage exchange of heat between the batteries and the air circulating axially between the sheath and the sleeves.

More particularly still, and particularly when air is admitted axially, inserts are positioned facing the intake aperture that lets air in toward the columns of batteries in order partially to impede the flow of air toward the columns of batteries facing the intake aperture and encourage the air to be split toward the other columns of batteries. These arrangements are such that the air is directed rather toward the batteries furthest from the intake aperture. The inserts for example stem from the sleeves surrounding the columns of batteries.

Particularly when air is admitted axially, the columns of batteries situated closest to the air intake aperture within the first compartment are preferably partially insulated. The insulation for the corresponding columns of batteries is advantageously borne by the sheath, or alternatively is formed from rings covering them.

More particularly still, in order to encourage exchanges of heat between the batteries and the air, a heat transfer element, made of aluminum in particular or some similar material, is advantageously attached to each of the anodes of the end batteries of the corresponding columns. This heat transfer element is, for example, formed from an extruded tube engaged with the anode bearing a heat exchange element or is alternatively formed from a finned plate borne jointly by the tubes. These fins are preferably inclined with respect to the axis along which the columns lie and extend beyond the thickness of the plate.

According to an embodiment variant, the finned plate is formed of a lattice structure secured to the tube, by welding, by brazing or by some similar technique in particular. According to another embodiment variant, the heat exchange element consists of an internal-toothed washer having fins (teeth). As the columns are housed within sleeves, the latter preferably comprise a member for axially retaining the internal-toothed washers having fins (teeth) toward the column of corresponding batteries.

According to one embodiment, the columns of batteries are housed inside cavities which are formed from a plurality of stacked plates having windows through which the columns pass. These plates in particular have means, such as perforations or the like, for causing boundary layer separation of the air flowing through these means. The windows preferably have radial slits at their edge so as to ensure close contact between the columns of batteries and the plates and encourage heat exchanges between these. These radial slits are for example cuts which advantageously leave flaps that form a collar that clamps the columns of batteries. The flaps advantageously constitute spacer pieces that space one plate from another.

The second compartment is preferably located downstream of the first compartment in the direction in which the air circulates, particularly at the rear of the vehicle so as to optimize the reduction in acoustic nuisance.

The blower is advantageously equipped with electronic control means for operating it. These arrangements are aimed at providing an airflow rate that is controllable inside the first compartment, particularly with respect to a tolerated temperature difference of the order of 5° C. between the air entering the first compartment and the air leaving it. Furthermore, these control means are used to control the air losses caused in the cabin of the vehicle because, in the preferred case and as necessary, air is being taken from inside the cabin to cool the batteries either directly or via a heating, ventilation and/or air-conditioning installation as will be described later on.

According to various embodiment variants of the electronic control means, these are either means for switching the blower on and off or means for operating the blower at a variable speed.

Said intake aperture and said discharge aperture are preferably each fitted with a nonreturn valve, particularly, so as to prevent outgoing air from finding its way into the cabin of the vehicle and to prevent exhaust gases from being admitted to one or other of the first and second compartments if the device is positioned at the rear of the vehicle near the exhaust pipe, respectively.

According to various embodiments, the first and second compartments are either formed in the one same casing or formed in respective casings communicating with one another.

According to an embodiment variant, the second compartment has said discharge aperture and at least one intake opening connected to a discharge opening of the first compartment, the second compartment in particular being fitted to the first compartment.

The blower preferably comprises at least two impellers each assigned to a respective intake opening of the second compartment, these intake openings being connected to a corresponding discharge opening belonging to the first compartment. These arrangements allow a suitable circulation of air from one of the compartments to the other, without in any way causing a prohibitive increase in the size of the device.

The discharge aperture and said intake aperture of the second compartment are preferably each equipped with a peripheral sealing gasket, particularly made of foam, or the like.

The second casing constituting the second compartment is formed from shells assembled with one another and which hold the blower and, as need be, the corresponding nonreturn valve.

According to one advantageous embodiment, the blower is that of a heating, ventilation and/or air-conditioning installation of the vehicle, which installation is located upstream of the first compartment and comprises an air discharge opening assigned to cooling the batteries. This air discharge opening is in particular connected to the first compartment via a duct.

It will be understood that, according to this variant, the air is routed from the installation, which comprises a said second compartment housing the blower, toward the first compartment located downstream, the latter being able furthermore to be equipped upstream with a casing housing an additional blower such as in the aforementioned embodiment variant to optimize the circulation of the air stream within the first compartment.

Such arrangements make it possible constantly to be able to lead cold air toward the first compartment, in order to make the batteries constantly available. It is also evident from this that, since the air is cooled, the amount of air that needs to be used to cool the batteries is thereby lower. By way of indication, the air flow rate needed is of the order of a factor of 2.5 times lower when the air is cooled.

According to an embodiment variant, the installation is a heating, ventilation and/or air-conditioning installation assigned to the region of the vehicle reserved for the rear seat passengers. These arrangements are aimed at using an existing installation of the vehicle modified slightly so as to reduce the costs specific to the cooling of the batteries for satisfactory effectiveness.

Said discharge opening is preferably situated downstream of an evaporator and upstream of a radiator that the installation comprises. Such a siting of the discharge opening allows air to be taken from the installation without disturbing the comfort afforded by the installation to the cabin interior.

According to another embodiment variant, said discharge opening is placed downstream of a radiator that the installation comprises. These arrangements are such that when the external air temperature dictates it, the batteries are heated by the air from the radiator, so that they operate in an optimum temperature range.

According to another embodiment variant of the device, the installation is an installation specifically assigned to cooling the batteries.

Said duct connecting the installation and the first compartment is preferably equipped with means for collecting and discharging condensate and preventing water from flowing toward the first compartment, and making the battery environment damp, as this dampness could, in particular, cause a deterioration in the electrical functioning of the batteries.

The means for collecting and discharging condensate consist, for example, of a condensate collector collecting condensate from the walls of the duct, and which is equipped with a spout for discharging the condensate from the duct.

Said discharge opening of the installation is preferably equipped with at least one air splitter member for selectively distributing air from the installation toward the first compartment.

Said air splitter member is made up, for example, of a set of at least two shutters. A first shutter is intended to shut off said opening assigned to cooling the batteries, while a second shutter is intended to shut off a main opening of the installation for distributing air to the radiator.

The first shutter is preferably an "open/closed" shutter while the second shutter is a shutter that can be opened progressively. For example, the first shutter is a barreled shutter equipped with the second shutter formed of a sliding shutter.

According to another exemplary embodiment, the first shutter and the second shutter are articulated to one another in the form of a bellows via one of their ends, the other end of the first shutter being articulated to the casing of the installation while the other end of the second shutter can slide along a guide rail.

Said duct is advantageously equipped with a supplementary air intake opening connected to a supplementary air intake pipe in communication with the outside of the vehicle. Said supplementary air intake opening is preferably equipped with a supplementary air splitter member which, in the closed position, closes off the supplementary air intake opening and allows air from the installation to pass through and which, in the open position, allows air to pass through the supplementary air intake opening and closes off the duct.

As a preference, and particularly when the blower is that of a heating, ventilation and/or air-conditioning installation, the device comprises an additional blower, particularly one housed in a second compartment adjoining the first compartment, or alternatively housed inside said duct.

DESCRIPTION OF THE FIGURES

The present invention will be better understood from reading the description of some preferred embodiments thereof that will be given in conjunction with the figures of the attached plates, in which.

In FIG. 1 to FIG. 4 a first compartment 1 housing batteries is depicted schematically in broken line. This first compartment 1 is intended to be equipped with a second compartment 2, with which it communicates. The second compartment 2, set out as a casing formed from two shells joined together, houses at least one blower 54 to cause air to circulate around and axially along the batteries in order to cool them.

According to the embodiment variant illustrated in FIG. 1 to FIG. 4, the second compartment 2 is intended to be positioned downstream of the first compartment 1 with respect to the direction in which the air stream circulates and comprises an intake opening 3, 3' intended to be placed facing a discharge opening 4, 4' for discharging the air originating from the first compartment 1. The latter 1 is also provided with an air intake aperture 5 to admit air to its interior volume, the air in particular being taken from inside the vehicle, for example from the volume of air in the trunk that houses the first compartment 1. These arrangements are such that the first compartment 1 is underpressurized because of the suction by the blower 54 of the air that the first compartment 1 contains. This minimizes the risk of any air that may have become contaminated upon contact with the batteries and which is present in the first compartment being disseminated into the vehicle.

According to a variant which has not been depicted, it may be imagined for the second compartment 2 to be positioned upstream of the first compartment 1 with respect to the direction in which the air stream circulates, in order to overpressurize the first compartment 1 thanks to forced intake into its interior volume of air originating from the second compartment 2.

The blower 54, depicted schematically in broken line, is equipped with a pair of impellers assigned respectively to chambers 6, 7 for admitting air originating from the first compartment 1. These arrangements are such that the suction power of the fan 54 is increased and the uniformity of the air admitted into the second compartment 2 is improved. The intake opening of the second compartment 2 is subdivided into two elementary intake openings 3, 3', each respectively connected to two elementary discharge openings 4, 4' of the first compartment 1. The second compartment 2 is also provided with an air discharge aperture 8 for discharging the air used for cooling the batteries to outside the vehicle, and more specifically to the rear of the vehicle. A nonreturn valve 300, depicted schematically in broken line, is preferably placed in the region of the discharge aperture 8 of the first compartment 1, to prevent any ingress of exhaust gases. Likewise, provision is made for the air intake aperture 5 that the first compartment 1 has to be equipped with a nonreturn valve 5 to prevent any air that may have been contaminated upon contact with the batteries from being admitted to the cabin of the vehicle.

Foam gaskets 9 are preferably inserted between the walls of the first and second compartments 1, 2 near the discharge 4, 4' and intake 3, 3' openings that these respectively comprise. Likewise, the discharge aperture 8 of the second compartment 2 is preferably equipped with such a foam gasket 10.

Electronic control means 11 are borne laterally by the second compartment 2 to control the operation of the blower 54. These electronic control means 11 operate, for example, according to an "on/off" law. In this case, these means 11 are simple and in particular require no elaborate battery-temperature sensor. For example also, these electronic control means 11 operate according to a variable law. One advantage of this variant lies in the fact that the current drawn by the blower 54 is adapted, making it possible to increase the battery operating duration.

Figures 1, 2, 3, 4:
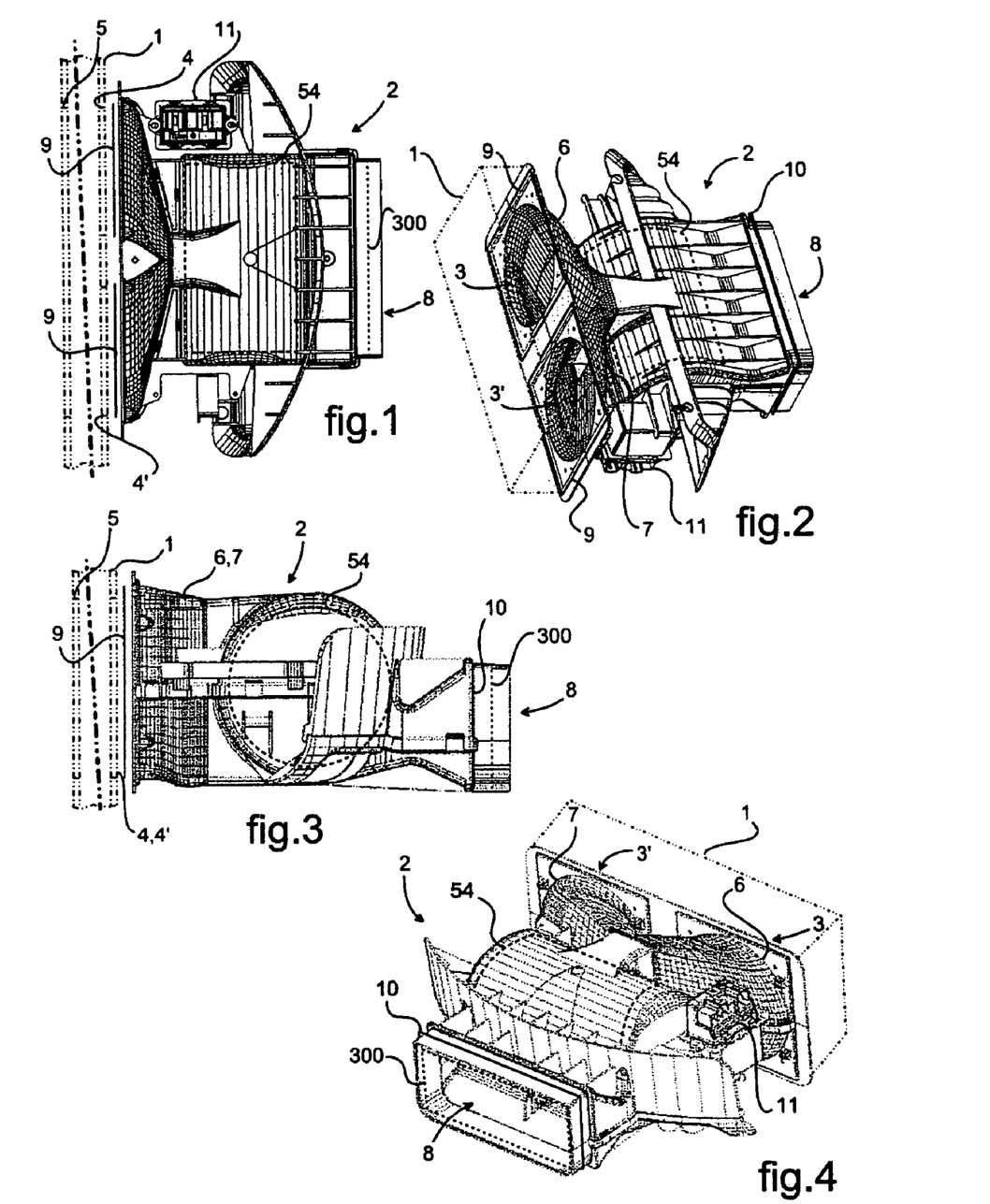
FIGS. 1 to 4 are illustrations of a compartment housing a blower for equipping another compartment housing batteries with a view to cooling them, viewed respectively from above, from the side, in perspective from the front and in perspective from the rear.
Figures 5, 6:
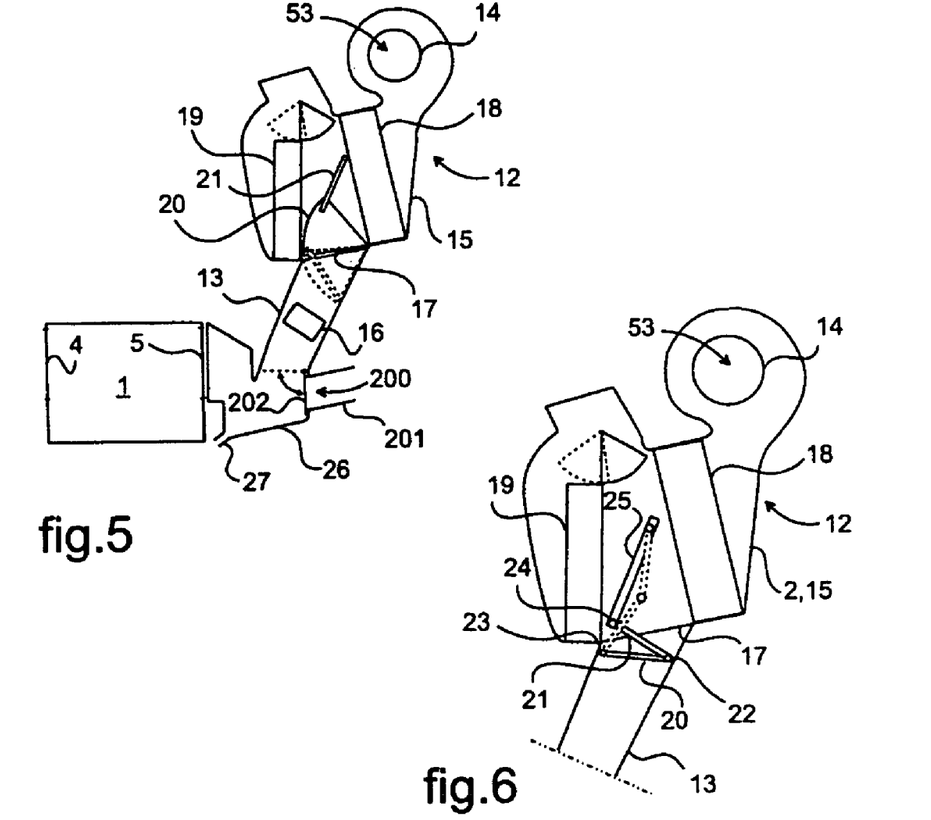
FIG. 5 is a schematic illustration of a heating, ventilation and/or air-conditioning installation intended for cooling batteries housed in a compartment, according to a first embodiment variant.
FIG. 6 is a schematic illustration of a heating, ventilation and/or air-conditioning installation intended for cooling batteries housed in a compartment, according to a second embodiment variant.

In FIG. 5 and FIG. 6 the first compartment 1 housing the batteries is connected to a heating, ventilation and/or air-conditioning installation 12 by means of a duct 13 so that the blower 14 of the installation is used to blow cooled air toward the first compartment 1. It will be understood by that that the second compartment housing the blower 14 is delimited by the casing 15 of the installation 12 and that the air intake aperture 53 of the installation 12 constitutes the air intake aperture of the cooling device.

When this installation 12 is specifically assigned to cooling the batteries, this installation can with equal preference be positioned either upstream or downstream of the first compartment 1.

In the case illustrated where this installation 12 is an installation belonging the vehicle and intended mainly for controlling the comfort in the cabin, this installation 12 is situated upstream of the first compartment 1. In a preferred embodiment variant, it is proposed for the connection between the first compartment 1 and the installation 12 positioned upstream to be associated with a complementary connection between the first compartment 1 and a casing 2 of the kind depicted in FIG. 1 to FIG. 4 which, in this case, houses an additional blower 54.

According to the embodiment variant illustrated in FIG. 5, such an additional blower 16 can be housed inside the duct 13 connecting the installation 12 to the first compartment 1, as schematically depicted.

The duct 13 is equipped with a supplementary air intake opening 200 connected to a supplementary air intake pipe 201 in communication with the outside of the vehicle. The supplementary air intake opening 200 is equipped with a supplementary air splitter member 202. In the closed position, this member 202 shuts off the supplementary air intake opening 200 and allows the inlet of air originating from the duct 13; in the open position, the member 202 allows an inflow of air through the supplementary air intake opening 200 and shuts off the duct 13. This results in selective cooling of the batteries using either air from the installation or air taken directly from outside the vehicle. This taking of external air affords the advantage of cooling the batteries without a specific energy-consuming means and without affecting the comfort of the occupants of the vehicle. The position of the member 202 is, for example, determined according to the speed of travel of the vehicle and/or according to the choice made by the occupants.

The installation 12 is provided with an air discharge opening 17 communicating with said duct 13, which opening is formed downstream of an evaporator 18 and upstream of a radiator 19. This discharge opening 17 is able to be formed in any one of the side walls or the bottom wall of the casing 15 of the installation 12. This discharge opening 17 is equipped with an air splitter member made up of a set of two shutters 20, 21. A first shutter 20 is intended to shut off said discharge opening 17 assigned to cooling the batteries, while a second shutter 21 is intended to shut off a main opening of the installation for distributing air to the radiator 19.

In the variant illustrated in FIG. 5, the shutters 20, 21 can be operated independently. The first shutter 20 is a drum shutter while the second shutter 21 is a progressively opening sliding shutter. In the variant illustrated in FIG. 6, the first shutter 20 and the second shutter 21 are articulated to one another in the form of a bellows at one of their ends 22. The first shutter 20 is articulated at its other end 23 to the casing 15 of the installation 12 while the second shutter 21 is mounted to slide, at its other end 24, along a guide rail 25.

Returning to FIG. 5, the duct 13 connecting the installation 12 and the first compartment 1 is equipped with a condensate collector 26 collecting condensate originating from the evaporator 18 and present on the walls of the duct 13, to prevent moisture from being led into the environment containing the batteries. This collector 26 is extended by a spout 27 for discharging the condensate collected. When the discharge opening 17 is formed in the bottom wall of the casing 15, the duct 13 may be spared the condensate collector 26.

Figure 7:
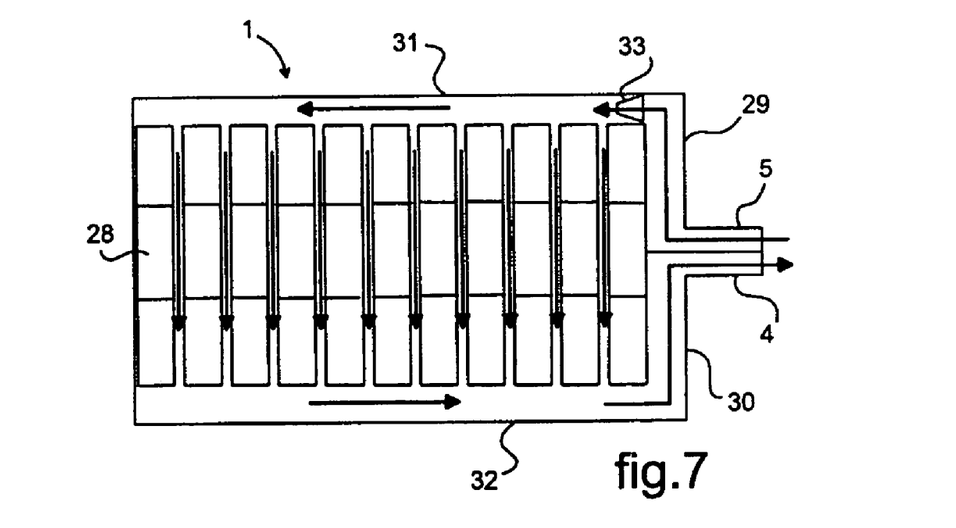
FIG. 7 is a schematic view in section of a compartment housing batteries according to a preferred embodiment.

In FIG. 7, the batteries are in a plurality, of the order of 50 to 400, distributed within the first compartment 1 in a plurality of adjacent columns 28. The air intake 5 and discharge 4 apertures in the first compartment 1 are formed laterally with respect to the columns 28 and are extended by a respective elbowed duct 29, 30. These elbowed ducts 29, 30 connect said intake 5 and discharge 4 apertures with upstream 31 and downstream 32 ventilation spaces respectively, situated on each side of the ends of the columns 28 of batteries, which are formed with an overall orientation orthogonal to the axis along which the columns 28 lie. These arrangements are aimed at causing air to circulate from a lateral intake 5 toward the upstream ventilation space 31, then axially along the columns 28 toward the downstream ventilation space 32, then finally laterally toward the discharge aperture 4. The elbowed nature of the ducts 29, 30 causes the air stream to become uniform and causes turbulence between the air intake and discharge in the region of the ventilation spaces 31, 32. In particular, these arrangements are such that the speed of the air circulating between the columns 28 of batteries is relatively uniform, even for air speeds of the order of 6 to 10 meters per second in the upstream ventilation space 31 and in the downstream ventilation space 32.

An airflow restriction nozzle 33 is preferably situated at the mouth of the upstream elbowed duct 29, upstream of the upstream ventilation space 31. The nozzle 33 causes the air passing through it to accelerate, and this makes the air stream within the upstream ventilation space 31 more uniform. The acceleration of the air also makes it possible to compensate for the pressure drop in the upstream 31 and downstream 32 ventilation spaces. It then follows that the distribution of the pressure of the air circulating between the columns 28 of batteries is relatively uniform. This nozzle 33 is preferably orientated toward the wall of the upstream ventilation space 31, at an angle smaller than 7°. It then follows that the air flowing near this wall circulates at a higher speed than the air flowing near the columns 28 of batteries in the upstream ventilation space 31.

Figure 8:
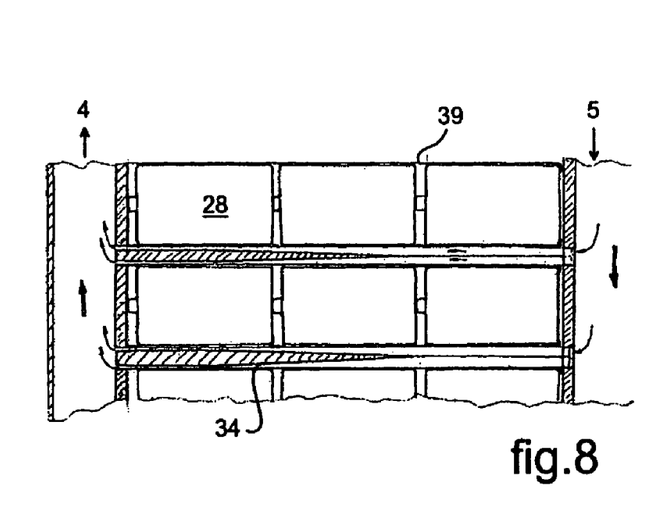
FIG. 8, FIG. 9 and FIG. 10 are schematic views in section of a battery compartment depicted in FIG. 7, illustrating particular layouts for the circulation of air according to respective embodiment variants.
Figure 9:
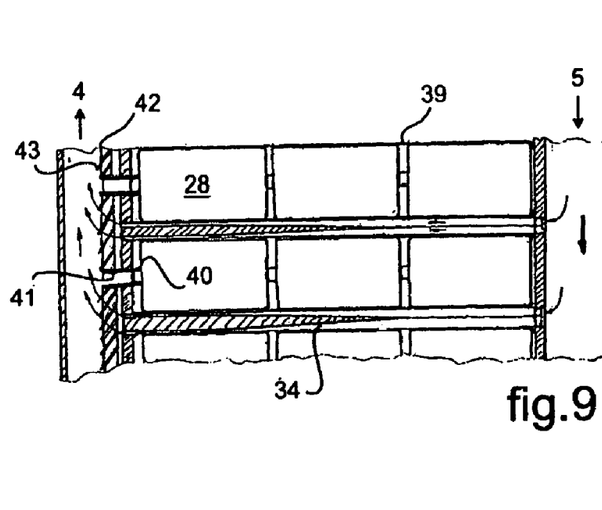
Figure 10:
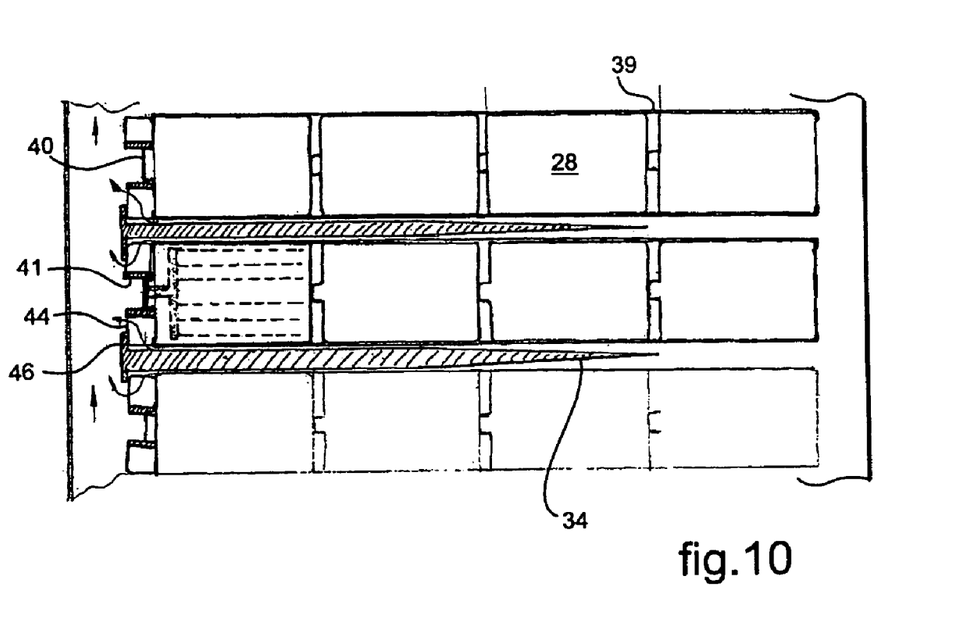
Figure 11:
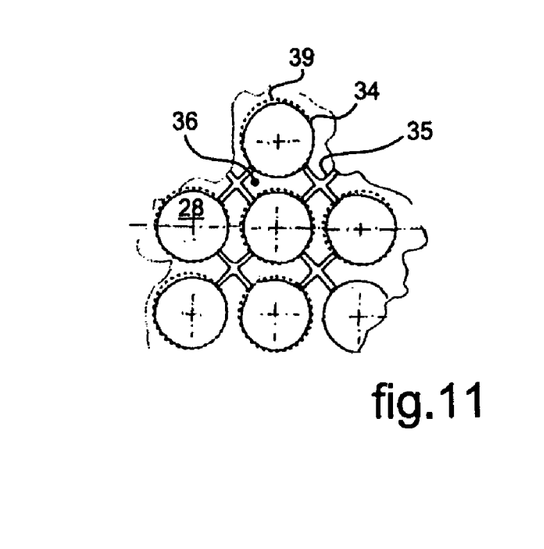
FIG. 11 and FIG. 12 are diagrams in cross section of a battery compartment depicted in FIG. 8 and FIG. 9, at their upstream and downstream ends respectively.
Figure 12:
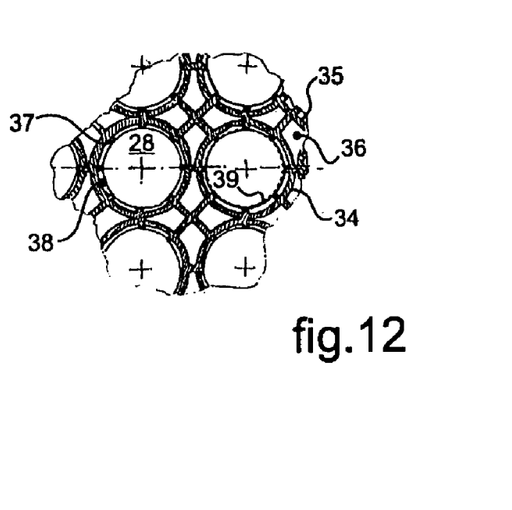
Figure 13:
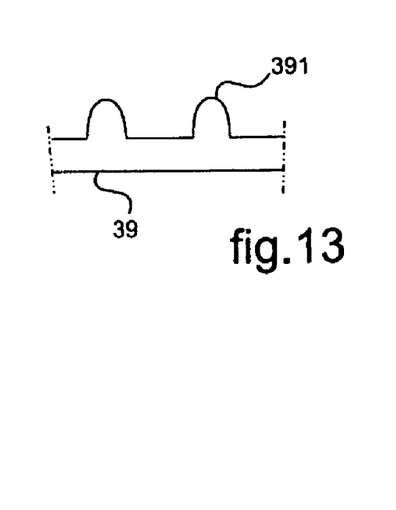
FIG. 13 is a partial schematic view in section of a sheath surrounding the batteries.

In FIG. 8 to FIG. 10, each column 28 of batteries is wrapped inside a sheath 39 that holds and secures the batteries. With reference to FIG. 13, the sheath 39 is made, for example, from plastic and preferably has ribs 391 to vary the heat exchange area. The ribs 391 are of the order of 0.3 to 2 mm tall and of the order of 0.5 to 3 mm long.

In FIG. 8 to FIG. 12, the columns 28 of batteries are separated from one another by inserts arranged as sleeves 34, spaced apart radially by cross-members 35 forming axial corridors 36 for the circulation of air along the columns 28 of batteries. The cross-members 35 are liable to exhibit a rough surface or even guides to direct the air circulating through the corridors 36 toward the columns 28 of batteries. The thickness of these sleeves 34 varies axially, reducing from the downstream end of the sleeves 34 toward their upstream end. Furthermore, the sleeves 34 comprise radial spacer pieces 37 forming axial air-circulation chambers 38 between themselves and the batteries.

According to an embodiment variant, the sheath 39 and the sleeves 34 may be combined.

In FIG. 9 and FIG. 10 a heat transfer element is attached to each of the anodes 40 of the downstream end batteries of the columns 28. As the batteries are axially in contact with one another via their anode, the heat is transmitted between the batteries from the upstream end of the columns 28 to their downstream end equipped with the heat transfer element. This heat transfer element is made up of tubes 41 which are attached to the anodes 40 of the batteries and which jointly bear the heat transfer element.

In the variant illustrated in FIG. 9, this heat exchange element consists of a finned plate 42, the fins being referenced 43, which is formed of a lattice structure secured to the tubes 41 for example by welding. Each column 28 of batteries is equipped with electrical insulators to prevent short-circuiting between two columns 28. The fins 43 are inclined with respect to the axis along which the columns 28 of batteries lie, and extend beyond the thickness of the plate 42.

Figure 14:
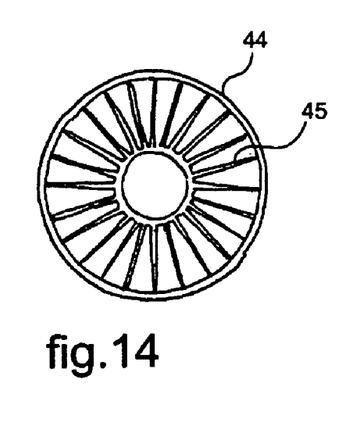
FIG. 14 is a detail in section of a internal-toothed washer fitted to a column of batteries according to the embodiment variant depicted in FIG. 10.

In the variant illustrated in FIG. 10, and with reference also to FIG. 14, the heat exchange element consists of a set of internal-toothed washers 44 with radial fins (teeth) 45 which are interposed between two adjacent tubes 41. The sleeves 34 are equipped at their downstream end with a member 46 for axially retaining the internal-toothed washers 44 having fins (teeth) 45.

Figure 15:
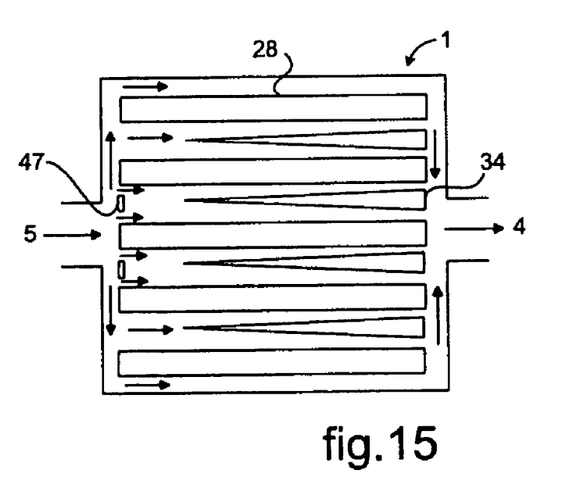
FIG. 15 is a schematic view of an embodiment variant of the batteries compartment in which the air is admitted to the columns axially.

In FIG. 15, air is admitted into the first compartment 1 axially with respect to the columns 28. Inserts 47 are placed in the path of the air near the columns 28 closest to the air intake aperture 5. These inserts 47 partially impede the flow of air toward these columns 28, so as to encourage the air to split up inside the first compartment 1 and make the cooling of all the columns 28 more uniform. These inserts 47 for example stem from the sleeves 34 surrounding the columns 28 of batteries. The sheath 39 is put to use to bear insulating elements around the batteries situated closest to the air intake aperture 5. These insulating elements are, for example, formed of rings or the like covering the batteries.

Figure 16:
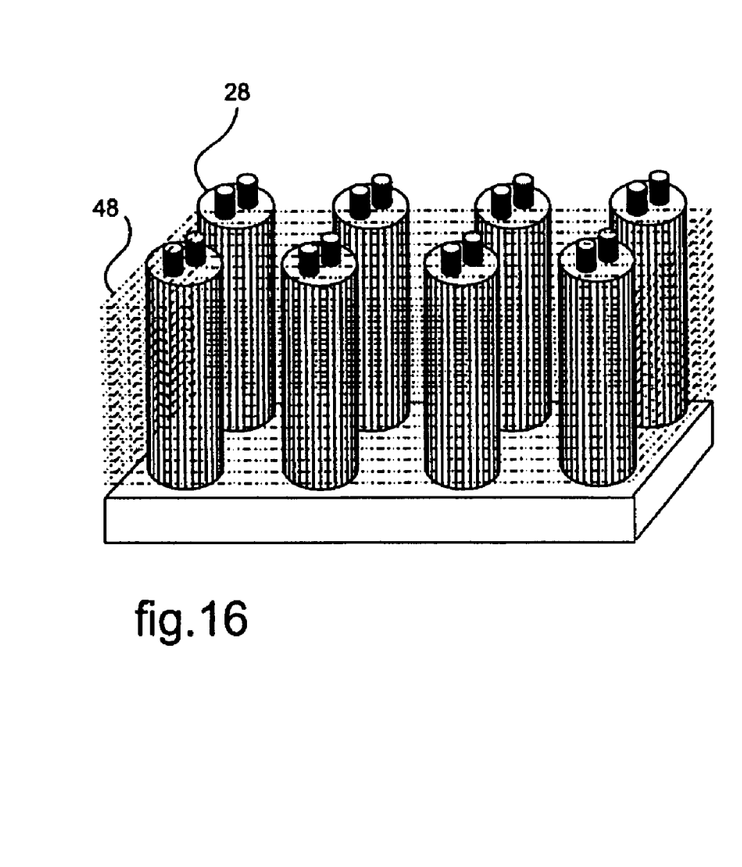
FIG. 16 is a schematic illustration in perspective with cutaway of a battery compartment according to another variant embodiment of the invention.
Figure 17:
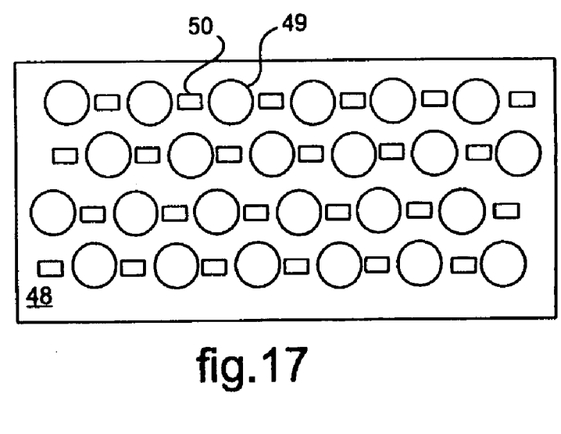
FIG. 17 is a front view of a plate equipping a battery compartment depicted in FIG. 14.
Figure 18:
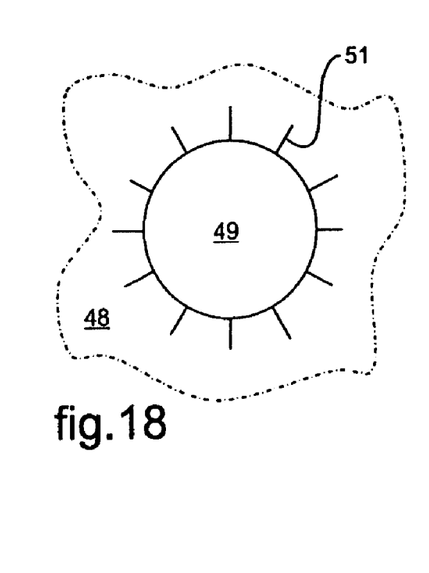
FIG. 18 and FIG. 19 are details of the plate depicted in FIG. 15, viewed from the front and viewed from the side respectively.
Figure 19:
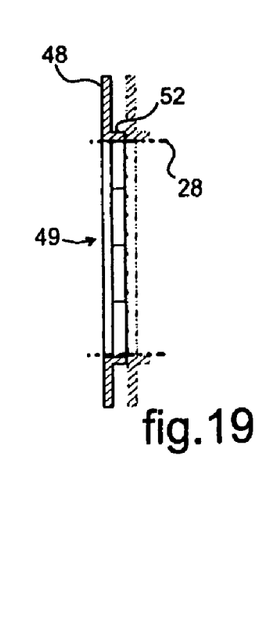

In FIG. 16, cavities surrounding the columns 28 of batteries are formed from stacked plates 48. In FIG. 17 to FIG. 18, the plates 48 have windows 49 through which the batteries pass, and perforations for the passage of air through them which constitute means 50 for causing boundary layer separation of air circulating through them. In FIG. 17 and FIG. 18, the windows 49 are bordered by radial slits 51, which form cuts to leave flaps 52 that form a collar that clamps the batteries. These flaps 52 also constitute spacer pieces spacing the plates 48 apart to keep these plates in distant superposition, and improve the heat contact between the plates 48 and the columns 28 of batteries.

The columns 28 of batteries are preferably covered with a lacquer or the like, or even a plastic insulator, to electrically insulate them from one another. The lacquer for example is between 0.02 mm and 0.4 mm, and preferably of the order of 0.1 mm thick, and has a thermal conductivity of the order of 1 W/m.K.

The invention claimed is:

1. A device for cooling batteries of an electrically or hybrid powered vehicle, these batteries being arranged inside a battery compartment (1) and distributed among a plurality of adjacent columns (28), said device circulating air around the batteries, characterized in that it comprises a pair of compartments in communication with one another, including a first compartment (1) housing the batteries and a second compartment (2) housing at least a blower (54, 14, 16), either one of these compartments (1, 2) having an air intake aperture (53, 5), while the other compartment (1, 2) has a discharge aperture (8) for discharging the admitted air to the outside; and wherein the columns (28) of batteries are housed inside respective sleeves (34) which are of variable thickness, reducing from their downstream end toward their upstream end.

2. A device according to claim 1, characterized in that the first compartment (1) modifies the dynamics of the air passing through it, starting from an axial circulation of air along the columns (28) of batteries.

3. A device according to either one of claims 1 and 2, characterized in that the first compartment (1) has air intake means (5) located on the columns (28), and routing means routing the admitted air toward an upstream ventilation space (31) located in a plane substantially orthogonal to the columns (28) of batteries, so as to cause air to circulate around the columns (28) axially toward a downstream ventilation space (32) substantially orthogonal to the columns (28) of batteries.

4. A device according to claim 3, characterized in that the first compartment (1) comprises respective air intake (5) and discharge (4) apertures which are formed on the columns (28) of batteries, and which open respectively onto elbowed lateral air inlet and outlet ducts (29, 30), these ducts (29, 30) being in communication with the upstream (31) and downstream (32) ventilation spaces so that the air is admitted substantially orthogonally to the columns (28) to be routed toward the upstream ventilation space (31) through an upstream elbowed duct (29), then circulated axially along the columns (28) of batteries toward the downstream ventilation space (32), then discharged laterally through a downstream elbowed duct (30).

5. A device according to claim 3, characterized in that an airflow restriction nozzle (33) is located upstream of the upstream ventilation space (31).

6. A device according to claim 3, characterized in that the volume of the upstream ventilation space (31) is greater than the volume of the downstream ventilation space (32).

7. A device according to claim 1, characterized in the sleeves (34) encourage the air passing through it to become turbulent and/or to accelerate.

8. A device according to claim 1, characterized in that the sleeves (34) are spaced apart by cross-members (35) forming corridors (36) for the axial circulation of air between and along the columns (28) of batteries.

9. A device according to claim 1, characterized in that the sleeves (34) are equipped with radial spacer pieces (37) holding the columns (28) of batteries in place and forming axial air circulation chambers (38) around these columns (28).

10. A device according to claim 2, characterized in that inserts (47) are positioned facing the intake aperture (5) that lets air in toward the columns (28) of batteries in order partially to impede the flow of air toward the columns (28) of batteries facing the intake aperture (5) and encourage the air to be split toward the other columns (28) of batteries.

11. A device according to claim 10, characterized in that the inserts (47) stem from sleeves (34) housing the columns (28) of batteries.

12. A device according to claim 1, characterized in that a heat transfer element is attached to each of the anodes (40) of the end batteries of the corresponding columns.

13. A device according to claim 12, characterized in that the heat transfer element is formed from an extruded tube (41) engaged with the anode (40) bearing a heat exchange element.

14. A device according to either one of claims 12 and 13, characterized in that the heat exchange element consists of an internal-toothed washer (44) having fins (teeth) (45).

15. A device according to claim 1, characterized in that the columns (28) of batteries are housed inside cavities which are formed from a plurality of stacked plates (48) having windows (49) through which the columns (28) pass.

16. A device according to claim 15, characterized in that the plates (48) have means (50) for causing boundary layer separation of the air flowing through these means (50).

17. A device according to either one of claims 15 and 16, characterized in that the windows (49) have radial slits (51) at their edge so as to ensure close contact between the columns (28) of batteries and the plates (48) and encourage heat exchanges between these.

18. A device according to claim 17, characterized in that the radial slits (51) are cuts leaving flaps (52) that form a collar that clamps the columns (28) of batteries.

19. A device according to claim 18, characterized in that the flaps (52) constitutes spacer pieces that space one plate (48) from another.

20. A device according to claim 1, characterized in that the second compartment (2) is located downstream of the first compartment (1) in the direction in which the air circulates.

21. A device according to claim 20, characterized in that the blower (54) is equipped with electronic control means (11) for operating it.

22. A device according to either one of claims 20 and 21, characterized in that said intake aperture (5) and said discharge aperture (8) are each fitted with a nonreturn valve (300).

23. A device according to claim 20, characterized in that the first and second compartments (1, 2) are formed in the one same casing.

24. A device according to claim 20, characterized in that the first and the second compartment (1, 2) are formed in respective casings communicating with one another.

25. A device according to claim 24, characterized in that the second compartment (2) has said discharge aperture (8) and at least one intake opening (3, 3') connected to a discharge opening (4, 4') of the first compartment (1), the second compartment (2) being fitted to the first compartment (1).

26. A device according to claim 1, characterized in that the blower (14) is that of a heating, ventilation and/or air-conditioning installation (12) of the vehicle, which installation is located upstream of the first compartment (1) and comprises an air discharge opening (17) assigned to cooling the batteries, which is connected to the first compartment (1) via a duct (13).

27. A device according to claim 26, characterized in that the installation (12) is a heating, ventilation and/or air-conditioning installation assigned to the region of the vehicle reserved for the rear seat passengers.

28. A device according to claim 26, characterized in that the installation (12) is an installation specifically assigned to cooling the batteries.

29. A device according to any one of claims 26 to 28, characterized in that said duct (13) is equipped with means (26, 27) for collecting and discharging condensate and preventing water from flowing toward the first compartment (1).

30. A device according to claim 29, characterized in that the means (26, 27) for collecting and discharging condensate consist of a condensate collector (26) collecting condensate from the walls of the duct (13), and which is equipped with a spout (27) for discharging the condensate from the duct (13).

31. A device according to any one of claim 26, characterized in that said discharge opening (17) of the installation (12) is equipped with at least one air splitter member (20, 21) for selectively distributing air from the installation (12) toward the first compartment (1).

32. A device according to claim 31, characterized in that said air splitter member is made up of a set of at least two shutters (20, 21) including a first shutter (20) for shutting off said opening (17) assigned to cooling the batteries, and a second shutter (21) for shutting off a main opening of the installation (12) for distributing air to the radiator (19).

33. A device according to claim 26, characterized in that said duct (13) is equipped with a supplementary air intake opening (200) connected to a supplementary air intake pipe (201) in communication with the outside of the vehicle.

34. A device according to claim 33, characterized in that said supplementary air intake opening (200) is equipped with a supplementary air splitter member (202) which, in the closed position, closes off the supplementary air intake opening (200) and allows air from the installation (12) to pass through and which, in the open position, allows air to pass through the supplementary air intake opening (200) and closes off the duct (13).

35. A device according to claim 1, characterized in that it comprises an additional blower (16).

36. A device according to claim 35, characterized in that the additional blower (16) is housed inside the duct (13).

* * * * *

UNITED STATES PATENT AND TRADEMARK OFFICE
CERTIFICATE OF CORRECTION

| | | |
|---|---|---|
| PATENT NO. | : 7,642,002 B2 | Page 1 of 1 |
| APPLICATION NO. | : 11/239807 | |
| DATED | : January 5, 2010 | |
| INVENTOR(S) | : Hamery et al. | |

It is certified that error appears in the above-identified patent and that said Letters Patent is hereby corrected as shown below:

Title page, item

(*) Notice: Subject to any disclaimer, the term of this patent is extended or adjusted under 35 U.S.C. 154(b) by 862 days.

Delete "862 days" and insert --1132 days--.

Column 12, line 59, after "according to," delete "any one of".

Signed and Sealed this

Twenty-seventh Day of July, 2010

David J. Kappos
*Director of the United States Patent and Trademark Office*